No. 838,436. PATENTED DEC. 11, 1906.
J. H. McCORMICK.
DRAFT GEARING.
APPLICATION FILED MAY 5, 1906.
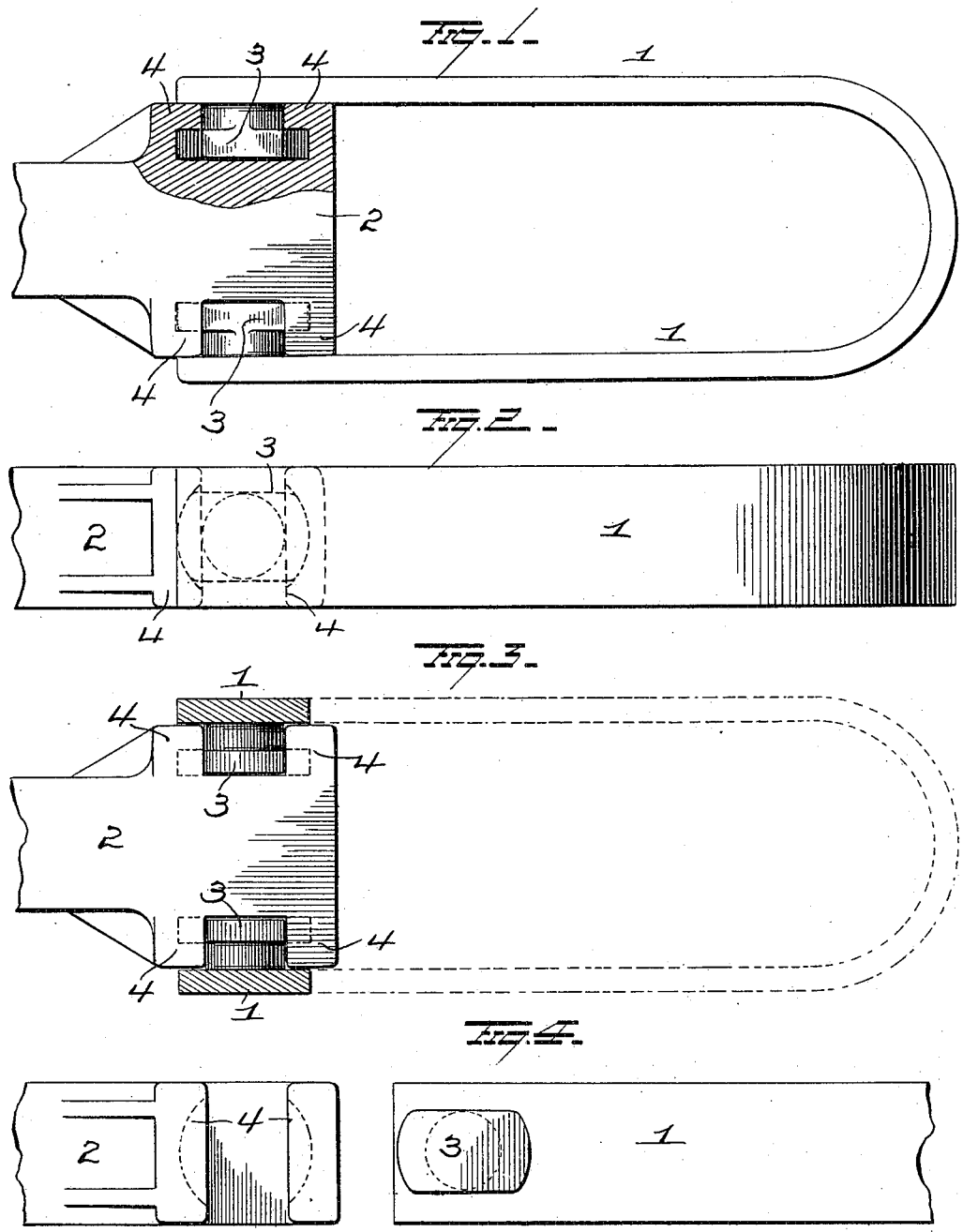
WITNESSES
E. D. Nottingham
G. F. Downing
INVENTOR
J. H. McCormick
By H. A. Seymour
Attorney

UNITED STATES PATENT OFFICE.

JOHN H. McCORMICK, OF COLUMBUS, OHIO.

DRAFT-GEARING.

No. 838,436.

Specification of Letters Patent.

Patented Dec. 11, 1906.

Application filed May 5, 1906. Serial No. 315,434.

*To all whom it may concern:*

Be it known that I, JOHN H. McCORMICK, a resident of Columbus, in the county of Franklin and State of Ohio, have invented certain new and useful Improvements in Draft-Gearing; and I do hereby declare the following to be a full, clear, and exact description of the invention, such as will enable others skilled in the art to which it appertains to make and use the same.

My invention relates to improvements in draft-gearing, and more particularly to improved means for connecting the yoke and butt-end of a coupler, the object of the invention being to so construct the parts as to permit the interlocking connection of the yoke and coupler without the employment of any third part; and the invention consists in certain novel features of construction and combinations and arrangements of parts, as will be more fully hereinafter described, and pointed out in the claims.

In the accompanying drawings, Figure 1 is a view in section illustrating my improvements. Fig. 2 is a top plan view illustrating my improvements. Fig. 3 is a view in longitudinal section showing yoke at right angles to the coupler, and Fig. 4 shows face views of the coupler and yoke-lugs.

1 represents the yoke, and 2 the butt-end of the coupler. The yoke at its ends is made with integral internal flanged or headed lugs 3, and the butt-end of the coupler is provided at top and bottom with oppositely-disposed integral flanged webs or lugs 4, forming pockets to receive the lugs 3, as will now be explained.

The flanges on the lugs 3 are made with circle arcs or rounded ends and flat or straight sides, the greatest length being in the direction of the length of the yoke, and the pockets in the lugs 4 are formed to receive the rounded ends of the flanges on the lugs 3, the space between the lugs in which the pockets are formed being smaller than the central line of the pockets longitudinally of the coupler. Also the flanges on the lugs may be made with flat or straight ends, so that they can be introduced between the lugs on the coupler without being turned at an angle. By this formation the yoke must be turned at right angles to the coupler to insert the lugs 3 between the pockets, and after being inserted the yoke is turned at right angles and in alinement with the coupler to lock the lugs in the pockets without the employment of any additional means. These lugs and pockets may of course be made of various other shapes to interlock, and the parts may be exactly reversed—namely, the lugs may be on the coupler and the pockets on the yoke—and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a draw-bar having transverse grooves in opposite faces, the walls of each groove having undercut recesses located at points centrally between their ends, of a yoke, lugs on the yoke to enter said grooves and flanges on the lugs to enter said undercut recesses.

2. The combination with a draw-bar having transverse grooves in opposite faces, the walls of said grooves having curved undercut recesses, of a yoke, lugs projecting inwardly from the members of said yoke and flanges on said lugs to enter said undercut recesses, the free ends of said flanges being curved.

3. The combination with a coupler having flanged lugs at top and bottom forming pockets with open ends, of a yoke, headed lugs on the inner faces of the yoke ends to enter between the pockets in the coupler when the yoke is at right angles to the coupler, and to lock in the pockets when the yoke is turned into alinement with the coupler.

In testimony whereof I have signed this specification in the presence of two subscribing witnesses.

JOHN H. McCORMICK.

Witnesses:
GEO. G. MERRINA,
F. G. BENNETT.